US012797861B2

(12) United States Patent
Ali et al.

(10) Patent No.: US 12,797,861 B2
(45) Date of Patent: Nov. 17, 2026

(54) COMBINED SLURRY INDUCER AND CRUSHER

(71) Applicant: Flowserve Pte. Ltd., Singapore (SG)

(72) Inventors: Azfar Ali, Macungie, PA (US); Nathan Terwilliger, Hellertown, PA (US)

(73) Assignee: Flowserve Pte. Ltd., Singapore (SG)

( * ) Notice: Subject to any disclaimer, the term of this patent is extended or adjusted under 35 U.S.C. 154(b) by 139 days.

(21) Appl. No.: 19/053,533

(22) Filed: Feb. 14, 2025

(65) Prior Publication Data

US 2026/0241388 A1 Aug. 20, 2026

(51) Int. Cl.

| | |
|---|---|
| ***B02C 19/06*** | (2006.01) |
| ***B02C 15/16*** | (2006.01) |
| ***B02C 23/00*** | (2006.01) |
| ***F04D 7/04*** | (2006.01) |

(52) U.S. Cl.

CPC ............ *B02C 19/066* (2013.01); *B02C 15/16* (2013.01); *B02C 23/00* (2013.01); *F04D 7/045* (2013.01)

(58) Field of Classification Search

CPC .......... F04D 29/42; F04D 29/54; F04D 7/045; F03D 29/2216; F03D 29/2288; E21B 17/22; B02C 15/16; B02C 23/00; B01J 19/18

See application file for complete search history.

(56) References Cited

U.S. PATENT DOCUMENTS

| | | | | |
|---|---|---|---|---|
| 7,455,497 B2 * | 11/2008 | Lee ..................... | F04D 29/2277 416/223 R |
| 7,810,747 B2 | 10/2010 | Allaire | |
| 2009/0090798 A1 * | 4/2009 | Allaire ................ | F04D 29/2288 241/46.17 |
| 2011/0027076 A1 * | 2/2011 | Alison-Youel ........ | F04D 29/448 415/185 |
| 2011/0046322 A1 * | 2/2011 | DePierri ............... | F04D 29/548 526/64 |
| 2021/0003138 A1 * | 1/2021 | Phui ........................ | F04D 29/52 |

FOREIGN PATENT DOCUMENTS

| | | | |
|---|---|---|---|
| KR | 100240229 B1 * | 1/2000 | ............. B02C 19/22 |

OTHER PUBLICATIONS

Translation of KR-100240229-B1.*

International Search Report and Written Opinion for PCT Application No. PCT/US2026/011735, mail date May 16, 2026, 9 pages.

* cited by examiner

*Primary Examiner* — Bobby Yeonjin Kim

(74) *Attorney, Agent, or Firm* — Maine Cernota & Curran

(57) ABSTRACT

A hybrid inducer/crusher pressurizes a slurry and crushes solid fragments therein. An inner passage of uniform diameter extending through a substantially cylindrical housing comprises an inducer segment, and a crusher segment in which stationary vanes extend radially inward. A first plurality of rotating vanes extending through both segments are thinner and larger in diameter in the inducer segment than in the crusher segment. A second plurality of rotating vanes are interspersed with the first plurality in the crusher segment, thereby reducing the inter-vane spacing. In embodiments, a third plurality of rotating vanes is interspersed in the crusher segment between the first and second pluralities of vanes. The rotating vanes in the crusher segment are of equal thickness, and pass in close cooperation with the stationary vanes. The slurry is thereby pressurized in the inducer segment, and fragments are crushed in the crusher segment between the rotating and stationary vanes.

8 Claims, 6 Drawing Sheets

COMBINED SLURRY INDUCER AND CRUSHER

FIELD OF THE INVENTION

The invention relates to rock crushing apparatus, and more particularly, to apparatus configured to crush large solid fragments included in a slurry.

BACKGROUND OF THE INVENTION

Many aspects of the mining and petroleum industries require rock-crushing apparatus that is configured to break large solid fragments into smaller particles that can be more readily accommodated. In some cases, the "rocks" that require crushing are included in a liquid slurry that is pumped through a crusher. One example is the crushing of petroleum coke in a refinery. Typically, a solid petroleum coke residue is produced from petroleum by a "coker" after all of the liquid components of the petroleum have been extracted. This solid coke residue is typically removed from the coker by a high-pressure water lance, resulting in a slurry of water and large, solid fragments of petroleum coke.

Depending on its properties, petroleum coke can be valuable as a fuel, functioning as an alternative to coal. Petroleum coke can also be used as a carbon source for manufacturing graphite electrodes for batteries, carbon brushes for motors, and activated carbon powders that are useful for water treatment and air purification. Further processing of a coke slurry to produce these end products requires that the slurry be pumped from the coker to various manufacturing apparatus. However, the large fragments of petroleum coke in the slurry can render pumping and processing of the slurry difficult or impossible. For this reason, it is often necessary for the slurry to pass through a coke crusher that is configured to break the large coke fragments into smaller, more manageable coke particles.

With reference to FIG. 1A, a typical slurry coke crusher 100 comprises a housing 102 having an outer diameter 120 and penetrated by an inner passage 104 extending from an inlet 108 thereof to an outlet thereof 110. Beyond the inlet 108, the inner diameter of the housing 102 is enlarged 130 to accommodate a plurality of spaced-apart stationary vanes 112 that extend inward from the housing 102 to within the inner passage 104. A plurality of thick, substantially spiral rotating vanes 114 are rotated in close cooperation with the stationary vanes 112 by a rotating shaft 116. Large fragments are drawn through the inlet 108 into a transition zone 132 from which they enter the crushing zone 128, where they are crushed against the stationary vanes 112 until they are small enough to fit between the rotating vanes 114, at which point the crushed particles are able to travel with the slurry to the outlet 110. Typically, overall constraints of the system require that the coke crusher 100 must fit within a specified diameter 120 and length 122.

While a crusher such as the example 100 illustrated in FIG. 1A can be very effective in reducing and limiting the sizes of the coke particles in the slurry, the crusher 100 also tends to significantly impede the flow of the slurry, due to significant blockage of the inner passage 104 by the large coke fragments that are temporarily held within the crusher 100 as they are being crushed. Typically, the number of stationary vanes 112 in the crusher 100 is limited, in an attempt to mitigate the resulting drop in the pressure of the slurry. For example, in FIG. 1A the crusher includes only four stationary vanes 112 that are equally spaced about the circumference of the inner passage 104. Nevertheless, the pressure drop that is introduced by the crusher 100 can strongly limit the head that can be produced by a subsequent slurry pump (not shown), which must be operated at a reduced speed so that its required net positive suction head (NPSH) is less than the pressure of the slurry as it exits the coke crusher 100.

As a result, to provide a required pumping head it can be necessary to include an additional pre-pump in the system, referred to herein as an "inducer," to raise the pressure of the slurry such that a subsequent, primary pump is able to produce the required head. However, the necessity of providing a separate inducer can significantly increase the cost and space requirements of the pumping system.

With reference to FIG. 1B, one approach is to replace the crusher 100 with an "inducer/crusher" 124 that combines the functions of an inducer and a crusher, and can be installed within the available diameter 120 and length 122. According to this approach, the inner passage 104 is divided into an inducer segment 126 and a crusher segment 128, separated by a transition segment 132. The inner passage 104 is uniform in diameter 106 through all three of the segments 126, 132, 128, while the inner diameter of the housing 102 is larger 130 in the transition segment 132 and the crusher segment 128 than in the inducer segment 126. In the transition segment 132 and the crusher segment 128, a plurality of stationary vanes 112 extend from the enlarged inner diameter 130 of the housing 102 to the diameter 106 of the inner passage 104. Rotating vanes 114 extend through both the inducer segment 126 and the crusher segment 128 of the inner passage 104. In the transition segment 132, the rotating vanes 114 include notched teeth 118 that provide space for fragments to enter the crusher segment 128, but in all other respects the rotating vanes 114 are uniform in construction through the two segments 126, 128.

While this approach can be effective for certain applications, it is essentially a compromise that provides reduced performance of both the inducer segment 126 and the crusher segment 128. In particular, the crusher segment 128 must be reduced in length so as to provide space for the inducer segment 126, thereby reducing the effectiveness of the crusher segment 128. Similarly, the effectiveness of the inducer segment 126 is reduced due to the short length of the inducer segment 126, the thickness of the rotating vanes 114, and the close spacing between the rotating vanes 114.

What is needed, therefore, is an inducer/crusher that can be implemented within a space having a limited length and diameter, and that provides effective crushing of solids within a slurry while maximizing the outlet pressure of the slurry.

SUMMARY OF THE INVENTION

The present invention is an inducer/crusher that can be implemented within a space having a limited length and diameter, and that provides effective crushing of solid fragments within a slurry while maximizing the outlet pressure of the slurry. The invention is applicable to crushing large fragments of coke included in a coke slurry. However, it will be understood that the scope of the present invention is not limited to crushing petroleum coke fragments, but extends to virtually all applications where it is necessary to crush rocks or other rigid, large, brittle fragments included in a slurry.

According to the present invention, the inducer/crusher comprises a housing having a length and an outer diameter that enable the inducer/crusher to fit within a specified diameter and length. A central cavity penetrates the inducer/crusher from an input thereof to an output thereof, and comprises an inducer segment, a transition segment, and a crusher segment. The inner diameter of the housing is uniform through all three segments. A plurality of stationary vanes extend inward within the transition and crusher segments from the inner diameter of the housing.

A first plurality of substantially spiral rotating vanes extend through the inducer segment, the transition segment, and the crusher segment, and are rotated by a rotating shaft. The dimensions of the first plurality of rotating vanes are not uniform throughout the central cavity. Instead, the first plurality of rotating vanes are relatively thinner and larger in diameter within the inducer segment than they are within the transition and crusher segments. In the transition segment, the vanes include notched teeth that enable large fragments to move out of the inducer segment and to enter the crusher segment.

A second plurality of rotating vanes, also rotated by the rotating shaft, extend only through the crusher segment, and are interspersed between the first plurality of rotating vanes. Embodiments further include a third plurality of rotating vanes in the crusher segment that are interspersed between the first and second pluralities of rotating vanes. Within the crusher segment, all of the rotating vanes are of substantially equal thickness, and are configured to crush large fragments against the stationary vanes until they are reduced to crushed particles that are small enough to fit between the rotating vanes, at which point the crushed particles are able to travel with the slurry to the outlet.

Accordingly, the effectiveness in the inducer segment is maximized by providing rotating vanes in the inducer segment that are thinner, larger in diameter, and more widely spaced apart than the rotating vanes in the crusher segment, while the effectiveness of the crusher segment is increased, and the sizes of the crushed particles are reduced, due to the increased number of rotating vanes in the crusher segment, and the consequently closer spacing therebetween. In embodiments, the effectiveness of the crusher segment is further augmented by providing an increased number of stationary vanes in the crusher segment, as compared to previous approaches, thereby providing even more "interactions" per rotation between the stationary vanes and the rotating vanes as the central shaft rotates.

In various embodiments, leading ends of the stationary vanes in the transition segment are chamfered or otherwise rounded or sloped, thereby facilitating entry of fragments into the crusher segment.

The present invention is an inducer/crusher that is applicable to crushing of solid fragments included in a slurry. The inducer/crusher includes a housing penetrated from an inlet thereof to an outlet thereof by a central cavity, said central cavity defining a substantially cylindrical housing inner wall of substantially uniform diameter. The central cavity includes an inducer segment and a crusher segment, a rotating shaft extending through the inducer segment and the crusher segment. A plurality of longitudinal stationary vanes are located within the crusher segment, the stationary vanes being spaced apart about the cylindrical inner wall of the housing and extending radially inward therefrom.

A first plurality of substantially spiral rotating vanes is fixed to the rotating shaft and extends through the inducer segment and through the crusher segment, the first plurality of rotating vanes being thinner and larger in diameter within the inducer segment than within the crusher segment. The first plurality of rotating vanes is configured during rotation thereof to pass within the inducer segment in close proximity with the cylindrical inner wall of the housing, and pass within the crusher segment in close proximity with radially inward surfaces of the stationary vanes.

The inducer/crusher further includes a second plurality of substantially spiral rotating vanes fixed to the rotating shaft and extending through the crusher segment, but not through the inducer segment, the second plurality of rotating vanes being interspersed between the first plurality of rotating vanes in the crusher segment, the second plurality of rotating vanes being configured within the crusher segment to pass in close proximity with the radially inward surfaces of the stationary vanes, the first and second pluralities of rotating vanes being of substantially equal thickness within the crusher segment, and being configured to crush solid fragments against the stationary vanes.

In embodiments, the plurality of stationary vanes includes at least six stationary vanes.

In any of the preceding embodiments, the central cavity can further comprise a transition segment upstream of the crusher segment, and the first plurality of vanes can extend through the transition segment. In some of these embodiments, within the transition segment the first plurality of vanes include notched teeth configured to enable large fragments to enter the crusher segment. In any of these embodiments the plurality of stationary vanes can comprise sloped, curved, or chamfered upstream-facing ends thereof extending into the transition segment.

In any of the preceding embodiments, the inducer segment can be upstream or downstream of the crusher segment.

And any of the preceding embodiments can further include a third plurality of substantially spiral rotating vanes fixed to the rotating shaft and extending through the crusher segment, but not through the inducer segment, wherein the third plurality of rotating vanes are interspersed between the first and second pluralities of rotating vanes in the crusher segment, the third plurality of rotating vanes are substantially equal in thickness to the first and second pluralities of rotating vanes in the crusher segment, the third plurality of rotating vanes are configured within the crusher segment to pass in close proximity with the radially inward surfaces of the stationary vanes, and the third plurality of rotating vanes are configured to crush solid fragments against the stationary vanes.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

The present invention is an inducer/crusher that can be implemented within a space having a limited diameter and length that provides effective crushing of solids within a slurry while maximizing the outlet pressure of the slurry. The exemplary embodiment described and illustrated herein is applicable to crushing large fragments of coke included in a coke slurry. However, it will be understood that the scope of the present invention is not limited to crushing petroleum coke fragments, but extends to virtually all applications where it is necessary to crush rocks or other rigid, large, brittle fragments included in a slurry.

Figure 2A:
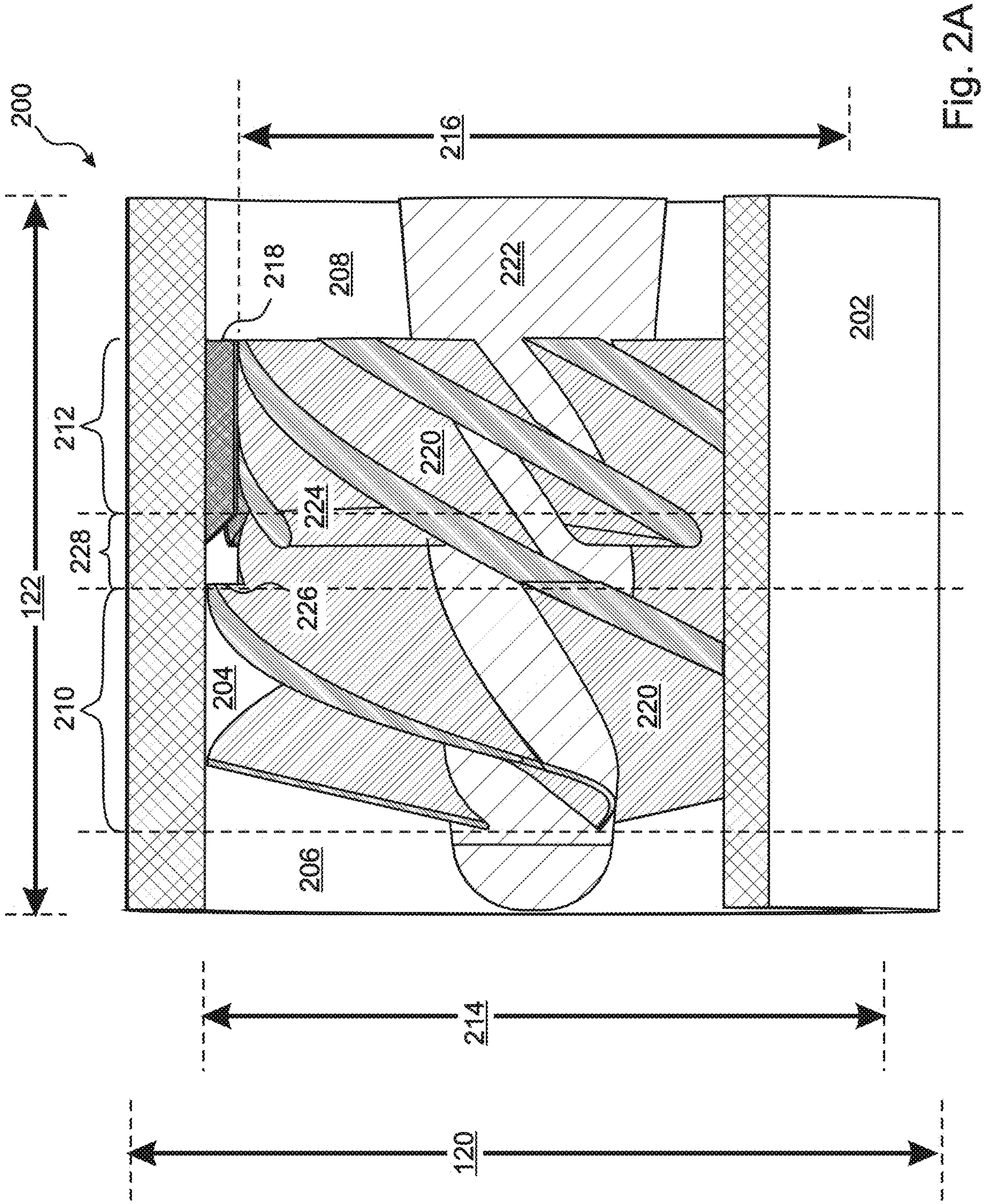
FIG. 2A is a side view drawn to scale of an embodiment of the present invention, wherein a segment of the housing has been removed to render the internal elements visible.
Figure 2B:
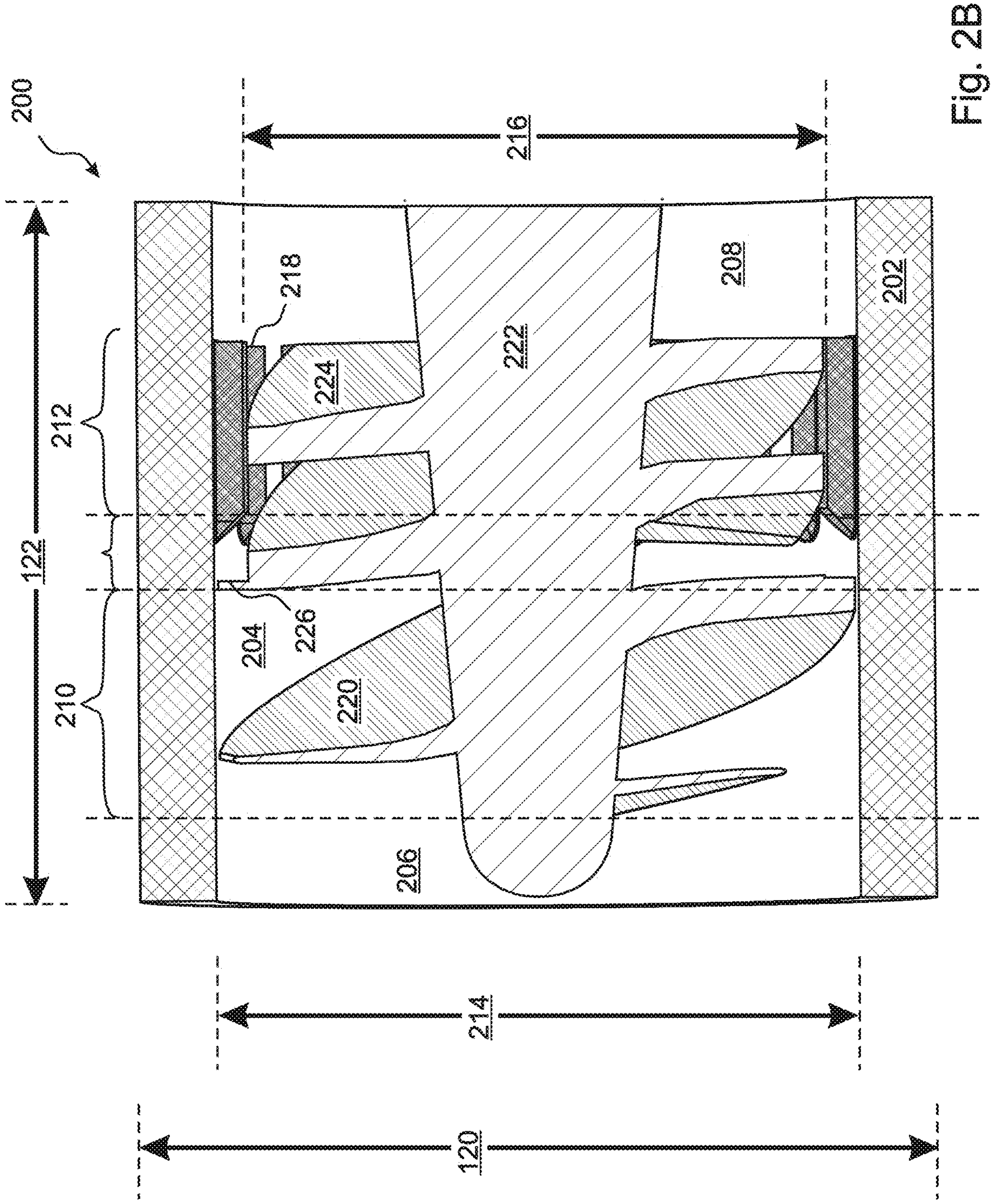
FIG. 2B is a sectional side view drawn to scale of the embodiment of FIG. 2A.

With reference to FIGS. 2A and 2B, according to the present invention the inducer/crusher 200 comprises a housing 202 having an outer diameter 120 and length 122 that enable the inducer/crusher 200 to fit within a specified diameter and length. A central cavity 204 penetrates the inducer/crusher 200 from an input thereof 206 to an output thereof 208, and comprises an inducer segment 210, a transition segment 228, and a crusher segment 212. FIG. 2A is a perspective side view of the exemplary embodiment, wherein a section of the housing 202 has been cut away to enable the interior elements to be viewed. FIG. 2B is a sectional side view of the same exemplary embodiment. In the illustrated embodiment, the inducer segment 210 is upstream of the crusher segment 212. However, it will be understood that in other embodiments, the order of these two segments 210, 212 is reversed, whereby the inducer segment is downstream of the crusher segment.

The inner diameter 214 of the housing 202 is uniform through both the inducer segment 210, the transition segment 228, and the crusher segment 212. A plurality of stationary vanes 218 within the crusher segment 212 extend inward from the inner diameter 214 of the housing 202, thereby defining a crusher diameter 216 that is smaller than the inner diameter 214 of the housing 202.

A first plurality of substantially spiral rotating vanes 220 extend through the inducer segment 210, the transition segment 228, and the crusher segment 212, and are rotated by a rotating shaft 222. The dimensions of the first plurality of rotating vanes 220 are not uniform throughout the central cavity 204. Instead, the first plurality of rotating vanes 220 are relatively thinner and larger in diameter within the inducer segment 210 than they are within the crusher segment 212. In the transition segment 228, the vanes 220 include notched teeth 226 that enable large fragments to move out of the inducer segment 210 and to enter the crusher segment 212.

A second plurality of rotating vanes 224, also rotated by the rotating shaft, are present in the crusher segment 212 but not in the inducer segment 210, and are interspersed between the first plurality of rotating vanes 220. Embodiments further include a third plurality of rotating vanes (not shown) present in the crusher segment 210, but not in the inducer segment 212, that are interspersed between the first plurality of rotating vanes 220 and the second plurality of rotating vanes 224. Within the crusher segment 212, all of the rotating vanes 220, 224 are of substantially equal thickness, and are configured to crush large fragments against the stationary vanes 218 until they are transformed into crushed particles that are small enough to fit between the rotating vanes 220, 224, at which point the crushed particles are able to travel with the slurry to the outlet 208.

Accordingly, the effectiveness in the inducer segment 210 is maximized by providing rotating blades 220 that are thinner, larger in diameter, and more widely spaced apart than the rotating vanes 220, 224 in the crusher segment 212, while the effectiveness of the crusher segment 212 is increased, and the sizes of the crushed particles are reduced, due to the increased number of rotating vanes 220, 224 present in the crusher segment 122. In embodiments, the effectiveness of the crusher segment 122 is further augmented by providing an increased number of stationary vanes 218 in the crusher segment 212, as compared to previous approaches, thereby providing even more "interactions" per rotation between the rotating vanes 220, 224 and the stationary vanes 218 as the central shaft rotates.

FIG. 2A is a perspective side view of the exemplary embodiment, wherein a section of the housing 202 has been cut away to enable the interior elements to be viewed. FIG. 2B is a sectional side view of the same exemplary embodiment. The enlarged thickness of the rotating vanes 220, 224 in the crusher segment 212, relative to the inducer section 210, is readily apparent in FIG. 2B.

Figure 1A:
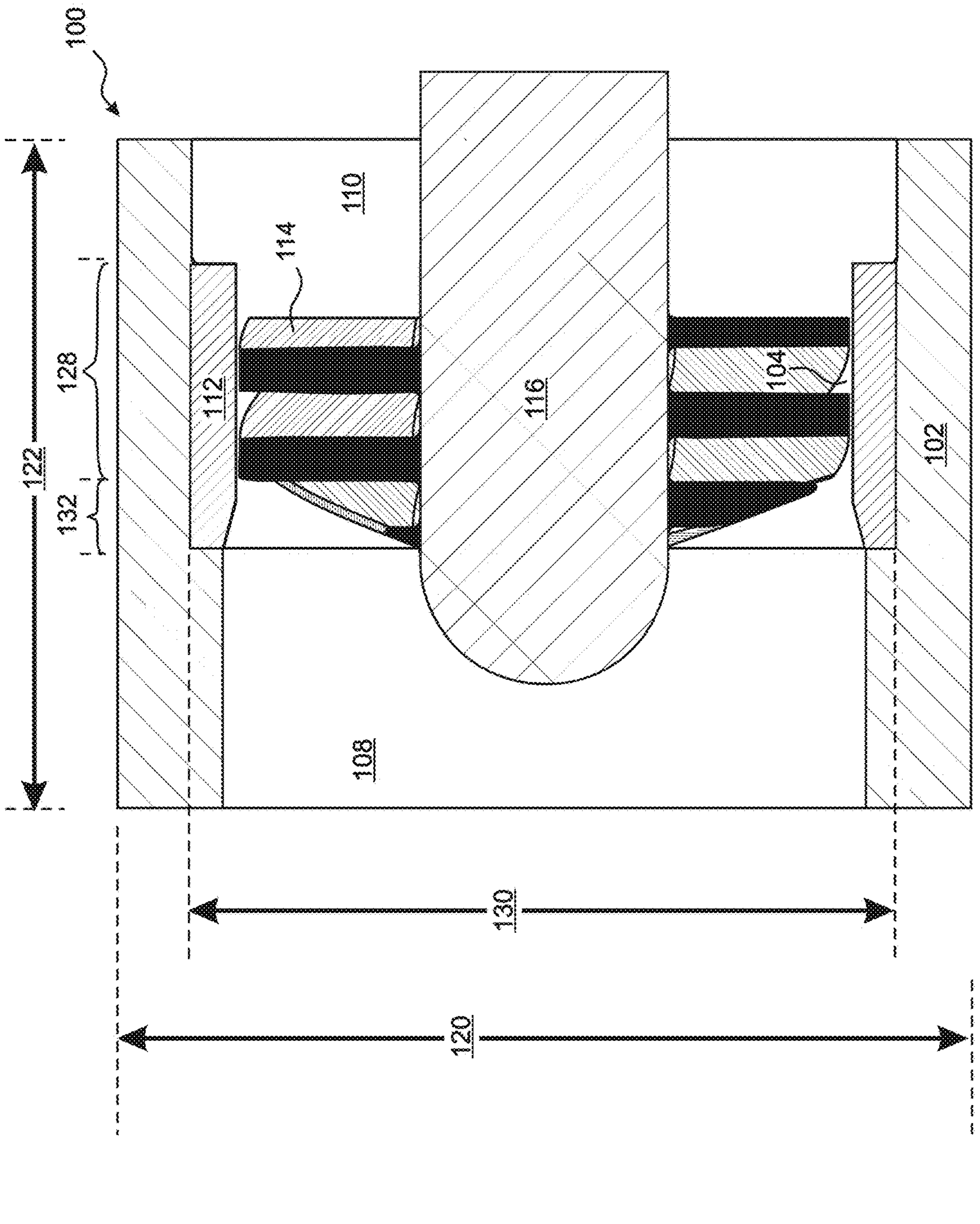
Fig. 1A (Prior art)
FIG. 1A is a sectional side view, drawn to scale, of a crusher of the prior art.
Figure 1B:
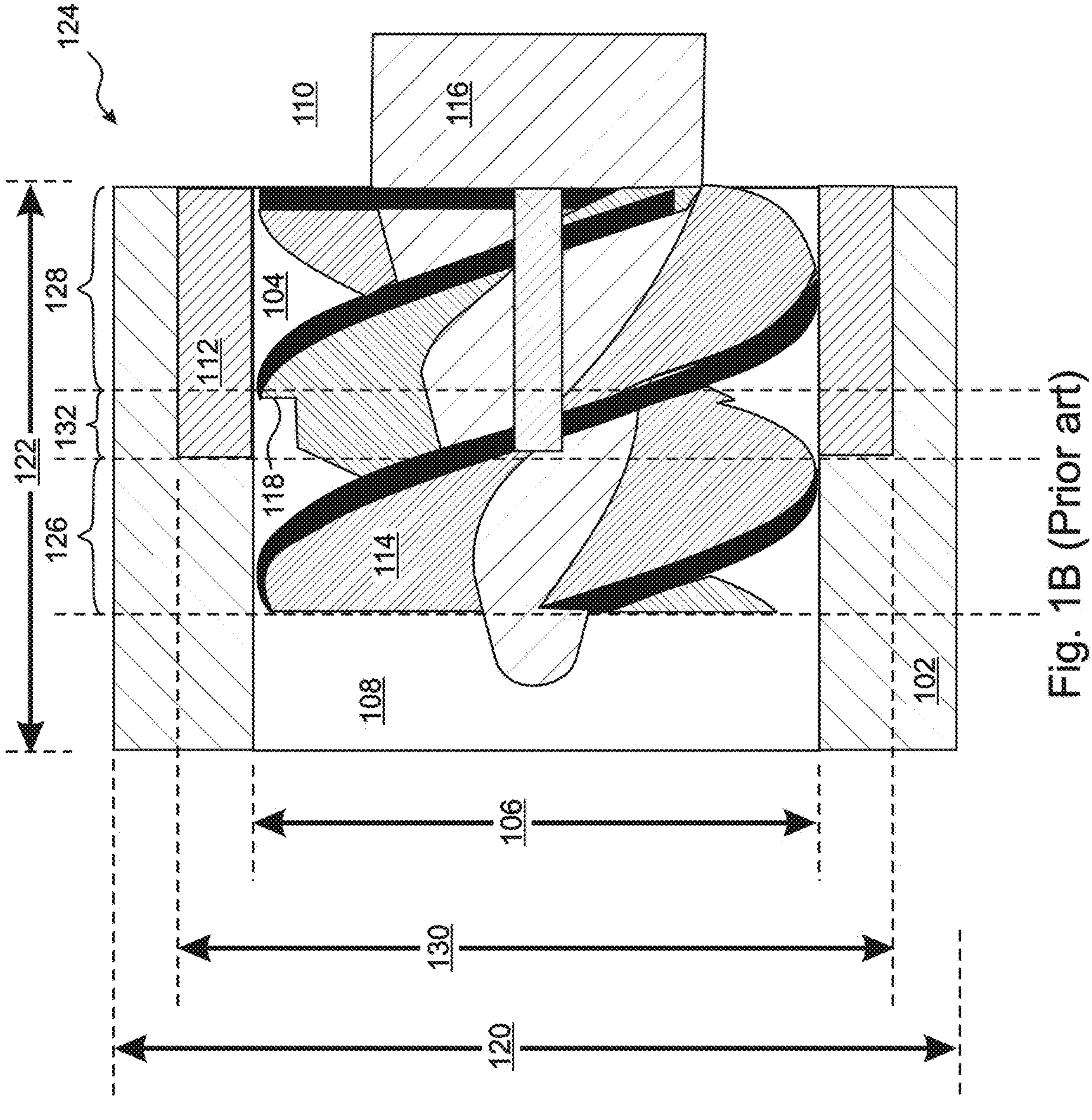
Fig. 1B (Prior art)
FIG. 1B is a side view of an inducer/crusher of the prior art, wherein the housing is illustrated in cross section to render the internal elements visible.
Figure 2C:
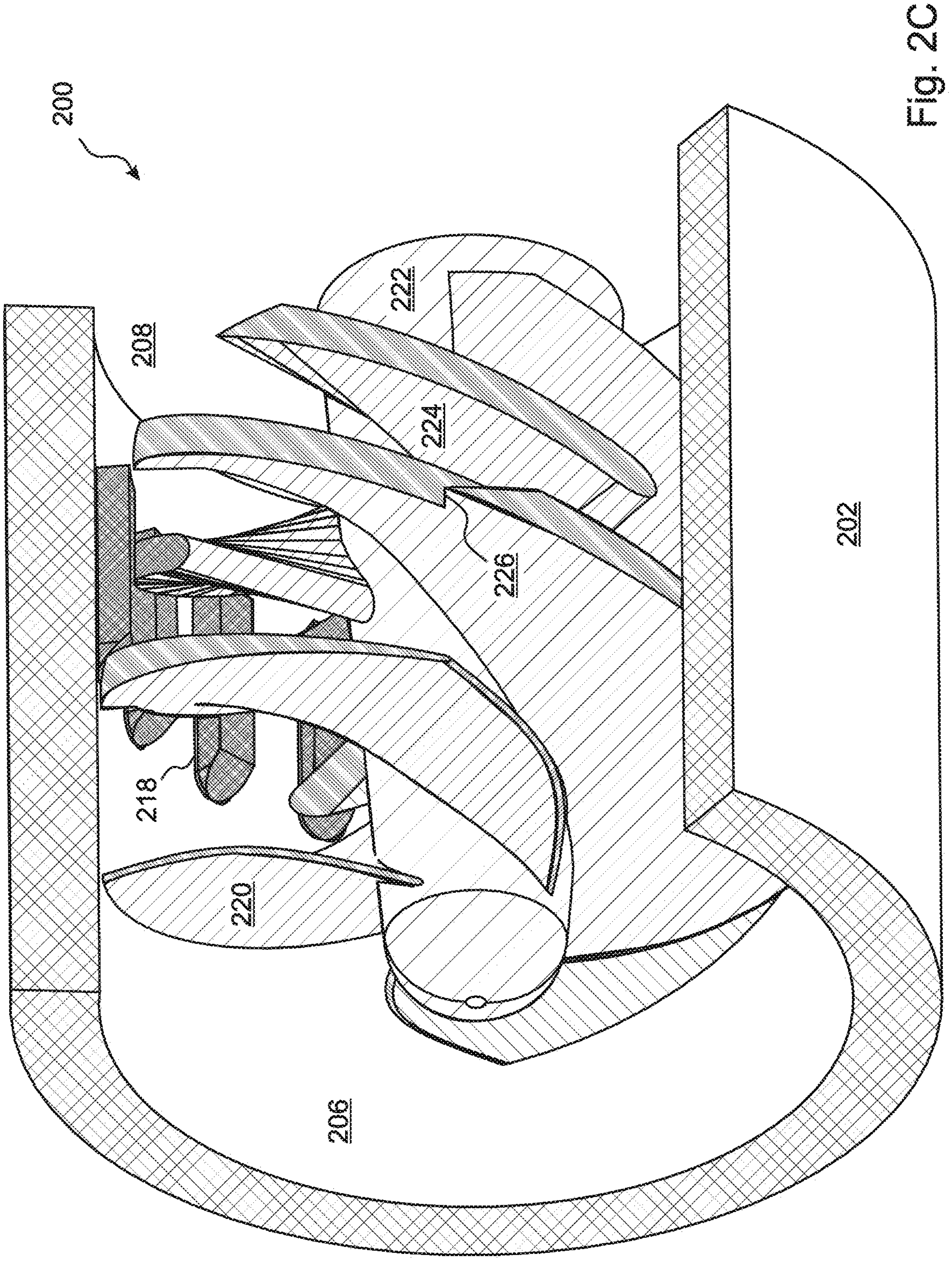
FIG. 2C is a perspective front view drawn to scale of the embodiment of FIG. 2A.
Figure 2D:
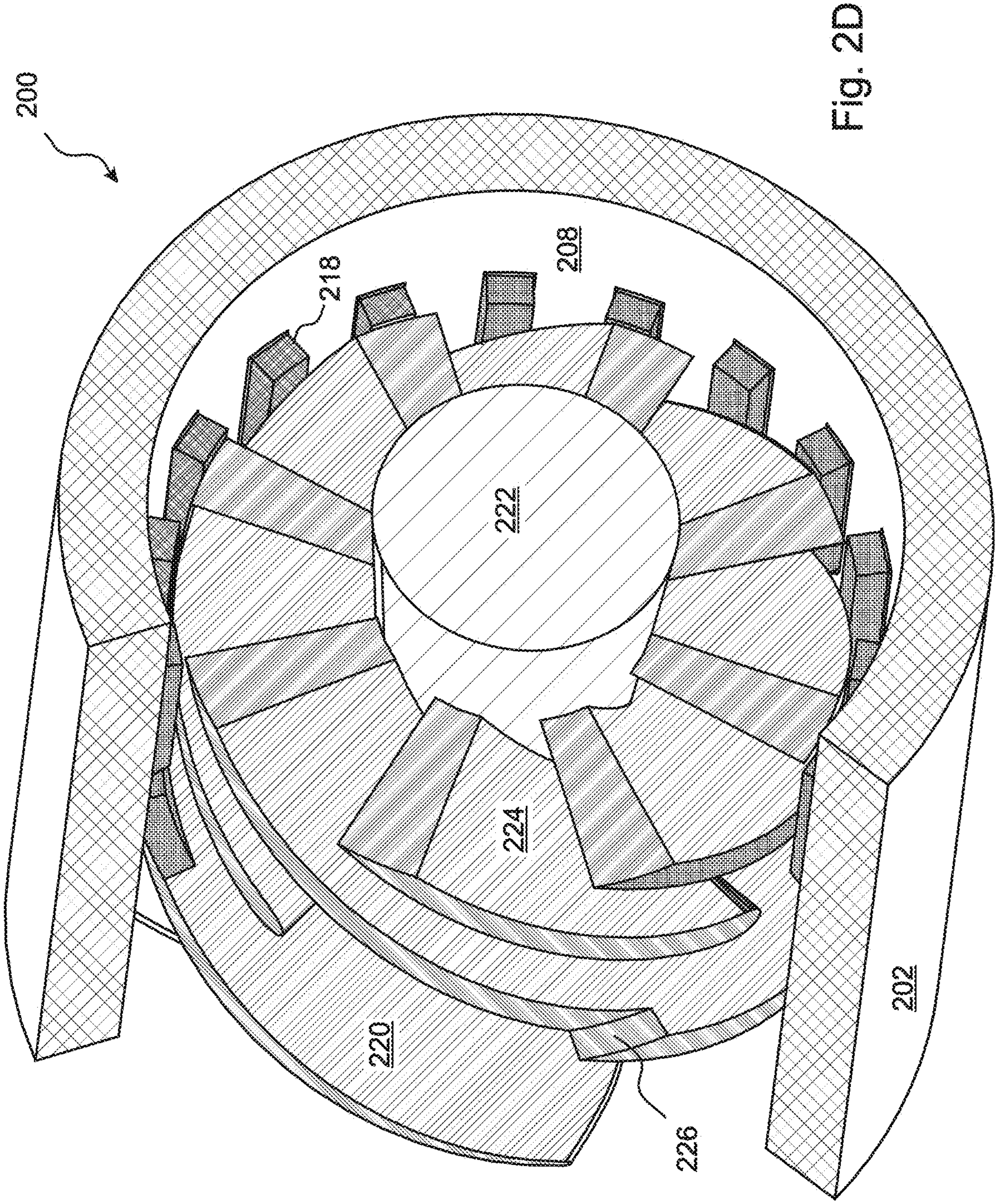
FIG. 2D is a perspective rear view drawn to scale of the embodiment of FIG. 2A.

FIG. 2C is a perspective front view of the embodiment of FIG. 2A, while FIG. 2D is a perspective rear view of the embodiment of FIG. 2A. It can be clearly seen in FIG. 2C that leading ends of the stationary vanes 218 are chamfered in the transition segment 228, thereby facilitating entry of fragments into the crusher segment 212. The increased number of stationary vanes 218, as compared to prior approaches such as FIG. 1B, is especially evident in FIG. 2D.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Although the present application is shown in a limited number of forms, the scope of the disclosure is not limited to just these forms, but is amenable to various changes and modifications. The present application does not explicitly recite all possible combinations of features that fall within the scope of the disclosure. The features disclosed herein for the various embodiments can generally be interchanged and combined into any combinations that are not self-contradictory without departing from the scope of the disclosure. In particular, the limitations presented in dependent claims below can be combined with their corresponding independent claims in any number and in any order without departing from the scope of this disclosure, unless the dependent claims are logically incompatible with each other.

What is claimed is:

1. An inducer/crusher applicable to crushing of solid fragments included in a slurry, the inducer/crusher comprising:

a housing penetrated from an inlet thereof to an outlet thereof by a central cavity, said central cavity defining a substantially cylindrical housing inner wall of substantially uniform diameter, said central cavity comprising an inducer segment and a crusher segment;

a rotating shaft extending longitudinally through the inducer segment and the crusher segment;

a plurality of longitudinal stationary vanes located within the crusher segment, the stationary vanes being spaced apart about the cylindrical inner wall of the housing and extending radially inward therefrom;

a first plurality of substantially spiral rotating vanes fixed to the rotating shaft and extending through the inducer segment and through the crusher segment, the first plurality of rotating vanes being thinner and larger in diameter within the inducer segment than within the crusher segment, the first plurality of rotating vanes being configured during rotation thereof to:

pass within the inducer segment in close proximity with the cylindrical inner wall of the housing; and pass within the crusher segment in close proximity with radially inward surfaces of the stationary vanes; and a second plurality of substantially spiral rotating vanes fixed to the rotating shaft and extending through the crusher segment, but not through the inducer segment, the second plurality of rotating vanes being interspersed between the first plurality of rotating vanes in the crusher segment, the second plurality of rotating vanes being configured within the crusher segment to pass in close proximity with the radially inward surfaces of the stationary vanes;

the first and second pluralities of rotating vanes being of substantially equal thickness within the crusher segment, and being configured to crush solid fragments against the stationary vanes.

2. The inducer/crusher of claim 1, wherein the plurality of longitudinal stationary vanes comprise at least six stationary vanes.

3. The inducer/crusher of claim 1, wherein the central cavity further comprises a transition segment upstream of the crusher segment, and wherein the first plurality of substantially spiral rotating vanes extend at least partway through the transition segment.

4. The inducer/crusher of claim 3, wherein within the transition segment the first plurality of substantially spiral rotating vanes include notched teeth configured to enable large fragments to enter the crusher segment.

5. The inducer/crusher of claim 3, wherein the plurality of longitudinal stationary vanes comprise sloped, curved, or chamfered upstream-facing ends thereof extending into the transition segment.

6. The inducer/crusher of claim 1, wherein the inducer segment is upstream of the crusher segment.

7. The inducer/crusher of claim 1, wherein the inducer segment is downstream of the crusher segment.

8. The inducer/crusher of claim 1, further comprising a third plurality of substantially spiral rotating vanes fixed to the rotating shaft and extending through the crusher segment, but not through the inducer segment, wherein:

the third plurality of substantially spiral rotating vanes are interspersed between the first and second plurality of substantially spiral rotating vanes in the crusher segment;

the third plurality of substantially spiral rotating vanes are substantially equal in thickness to the first and second plurality of substantially spiral rotating vanes in the crusher segment;

the third plurality of substantially spiral rotating vanes are configured within the crusher segment to pass in close proximity with the radially inward surfaces of the stationary vanes; and the third plurality of substantially spiral rotating vanes are configured to crush solid fragments against the stationary vanes.

* * * * *